(12) United States Patent
Feutz et al.

(10) Patent No.: US 8,407,365 B2
(45) Date of Patent: Mar. 26, 2013

(54) METHOD AND SYSTEM FOR AUTODISCOVERY OF A NETWORK PATH

(75) Inventors: Gary S. Feutz, Roselle, IL (US); Thomas T. Rarick, Wheaton, IL (US); Devindran Rajakrishna, Kentwood, MI (US)

(73) Assignee: Tellabs Operations, Inc., Naperville, IL (US)

( * ) Notice: Subject to any disclaimer, the term of this patent is extended or adjusted under 35 U.S.C. 154(b) by 2987 days.

(21) Appl. No.: 10/853,012

(22) Filed: May 24, 2004

(65) Prior Publication Data
US 2006/0031573 A1 Feb. 9, 2006

(51) Int. Cl.
G06F 15/173 (2006.01)
G06F 11/00 (2006.01)
H04W 40/00 (2009.01)
H04L 12/28 (2006.01)

(52) U.S. Cl. ........ 709/238; 455/455; 370/237; 370/238; 370/351

(58) Field of Classification Search .................. 709/238; 455/445; 370/237, 238, 351
See application file for complete search history.

(56) References Cited

U.S. PATENT DOCUMENTS

| | | | |
|---|---|---|---|
| 5,233,600 A * | 8/1993 | Pekarske | 370/228 |
| 5,694,547 A | 12/1997 | Subramanian et al. | |
| 5,821,937 A | 10/1998 | Tonelli et al. | |
| 6,049,529 A * | 4/2000 | Brimmage et al. | 370/248 |
| 6,233,458 B1 * | 5/2001 | Haumont et al. | 455/445 |
| 6,269,330 B1 | 7/2001 | Cidon et al. | |
| 6,496,476 B1 * | 12/2002 | Badt et al. | 370/228 |
| 6,594,044 B1 | 7/2003 | Buchanan et al. | |
| 7,136,357 B2 * | 11/2006 | Soumiya et al. | 370/236 |
| 2002/0161879 A1 | 10/2002 | Richard | |
| 2003/0046390 A1 | 3/2003 | Ball et al. | |
| 2003/0133556 A1 | 7/2003 | Naik et al. | |
| 2005/0160179 A1 * | 7/2005 | Retana et al. | 709/238 |

* cited by examiner

*Primary Examiner* — Guang Li
(74) *Attorney, Agent, or Firm* — Hamilton, Brook, Smith & Reynolds, P.C.

(57) ABSTRACT

A method and apparatus for discovering network paths sets a bit, normally used for purposes other than tracing a network path, in an overhead portion of a signal for causing state changes at nodes along a network path. The state changes are correlated with information about the signal to determine link connectivity between nodes to identify the network path. In a network of DS3 circuits, a non-critical alarm bit is set in a signal to transmit Remote Alarm Indications (RAI) which activate alarms at nodes of the network path. A response signal from the nodes can be sent through a network to a main node for correlation purposes. The method of discovering network paths can be used to update network path databases of network carriers and can be offered as a service to network carriers.

29 Claims, 6 Drawing Sheets

METHOD AND SYSTEM FOR AUTODISCOVERY OF A NETWORK PATH

BACKGROUND OF THE INVENTION

Communications networks generally comprise two or more individual communication nodes, such as a computer or a phone, connected together by other network elements, such as a router or switch. These devices and network elements may be connected in a variety of ways, including via electrical and fiber-optic cables. A cable defines a connection, or communication link, between two adjacent network nodes, and a network path within a network is defined by a connection between two end nodes. Nodes located along the network path between the two end nodes are referred to as intermediate nodes.

One type of physical transport standard used to communicate between end nodes is Digital Signal 3 (DS3). DS3 (also known as T3) is a North American standard (ANSI T1.404) developed by the ANSI T1 subcommittee. A network link using DS3 has a total bandwidth of approximately 44.7 Mbps and is capable of multiplexing 672 potential channels for voice or data. A DS3 or physical T3 signal has the ability to carry characteristic information at the path layer.

Using DS3 cables that travel through intermediate nodes, network carriers establish dedicated network paths, interchangeably referred to herein as circuits, between two points, for example, between nodes in Boston and Chicago. Information regarding these network paths are often maintained in databases. Because the lines are dedicated, for efficient resource utilization and improved provisioning time, it is important for network carriers to be aware of which DS3 cables are being used in each of the network paths within its network. Accurate topological views of DS3 network paths are useful to efficiently utilize networking equipment, especially since network paths are constantly being added and altered in a network. Network carriers' DS3 circuit databases are difficult to maintain and typically contain a sizeable number of records that do not match the actual network paths in the network. These erroneous records cost the network carrier in both unused inventory and recovery labor as new circuits are being planned and implemented, and also when network paths are to be removed.

Prior approaches to updating these network path databases include manual tracing of paths and some automation to query network elements for their internal cross connects. Both of these approaches have limitations. Manual tracing of paths is very costly and time consuming. The retrieval of cross connect records by querying network elements can verify only a fraction of the path information and cannot produce end to end connectivity information. Payloads within packets have also been used for tracing purposes, but use of payload space within packets is dependent on either availability (i.e., unused payload space) or is intrusive and disrupts payload transfer.

SUMMARY OF THE INVENTION

The present invention provides a method and apparatus for automatically discovering or otherwise determining or identifying a network path by causing state changes at nodes along the network path activated by at least one overhead bit in a signal, such as a DS3 signal. The overhead bits are normally used for purposes other than finding a network path. The method and apparatus correlates state changes to determine link connectivity between nodes to determine the network path.

The method or apparatus can be used to provide a service to network carriers for updating connectivity records by comparing records of auto-discovered paths with existing records of path information stored in the network carrier's connectivity database.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
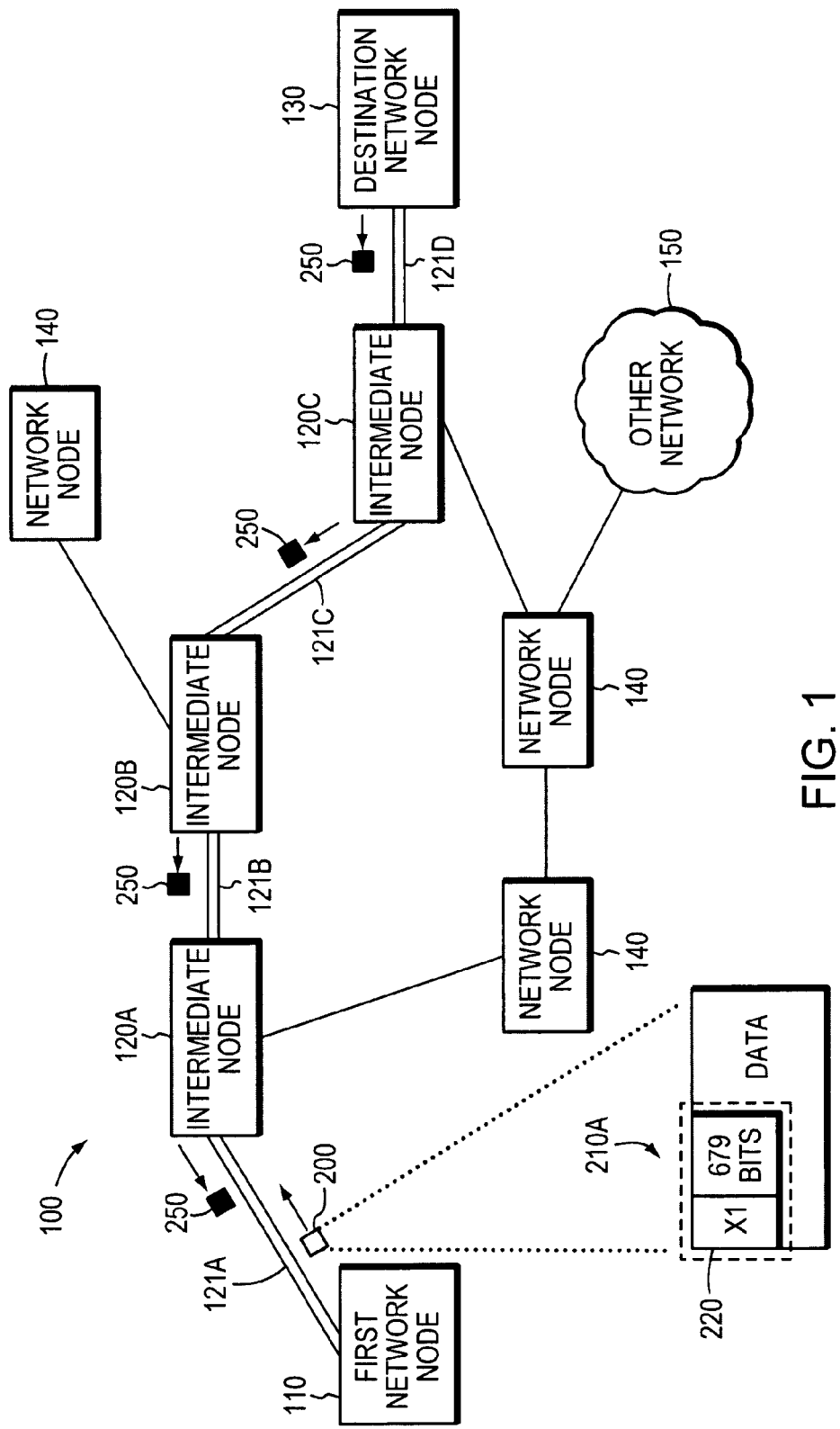
FIG. 1 is a block diagram of a network having a network path in which the present invention may be deployed.

FIG. 1 is a block diagram of an example network 100 in which an embodiment of the present invention may be deployed. The network 100 includes a first network node 110 and a destination network node 130. Although there may be multiple paths between the first network node 110 and the destination network node 130, a network path 121A, 121B, 121C, 121D (collectively, path 121) between the two nodes is defined as running through intermediate nodes 120A, 120B, 120C (collectively, nodes 120). That is, the path 121 through the intermediate nodes 120 is assigned by a network carrier as the circuit through which data will flow between the first network node 110 and the destination network node 130. Other nodes 140 may also be connected to various nodes in the network path 121 and provide network structure (i.e., alternative intermediate nodes) for an alternative path between the first network node 110 and the destination network node 130. In this example network 100, one of the other network nodes 140 is also connected to another network 150. The other network 150 may be any type of network, for example a Local Area Network (LAN), Wide Area Network (WAN), or cellular network.

Given the extensive build-out of networks, applications designed with the intent of providing cost benefits to the network carrier by helping salvage lost resources should be able to do so free from disrupting traffic. Applications that meet such criteria are useful to be integrated into a network 100 and enabled for operation within the network. Some transport protocols, such as non-C bit parity DS3, do not provide provisions for carrying path trace information in the link or physical layer, thus preventing the automatic identification of physical connectivity between network nodes. The majority of DS3s deployed in networks are non-C bit parity.

In the case of DS3, DS3 frames include overhead data that can be used to carry the path layer information of a DS3 connection. Certain existing overhead bits in the DS3 frames, which are normally used for other purposes, are used in the present invention to carry identifying information that enables an automated DS3 path discovery capability.

Figure 3:
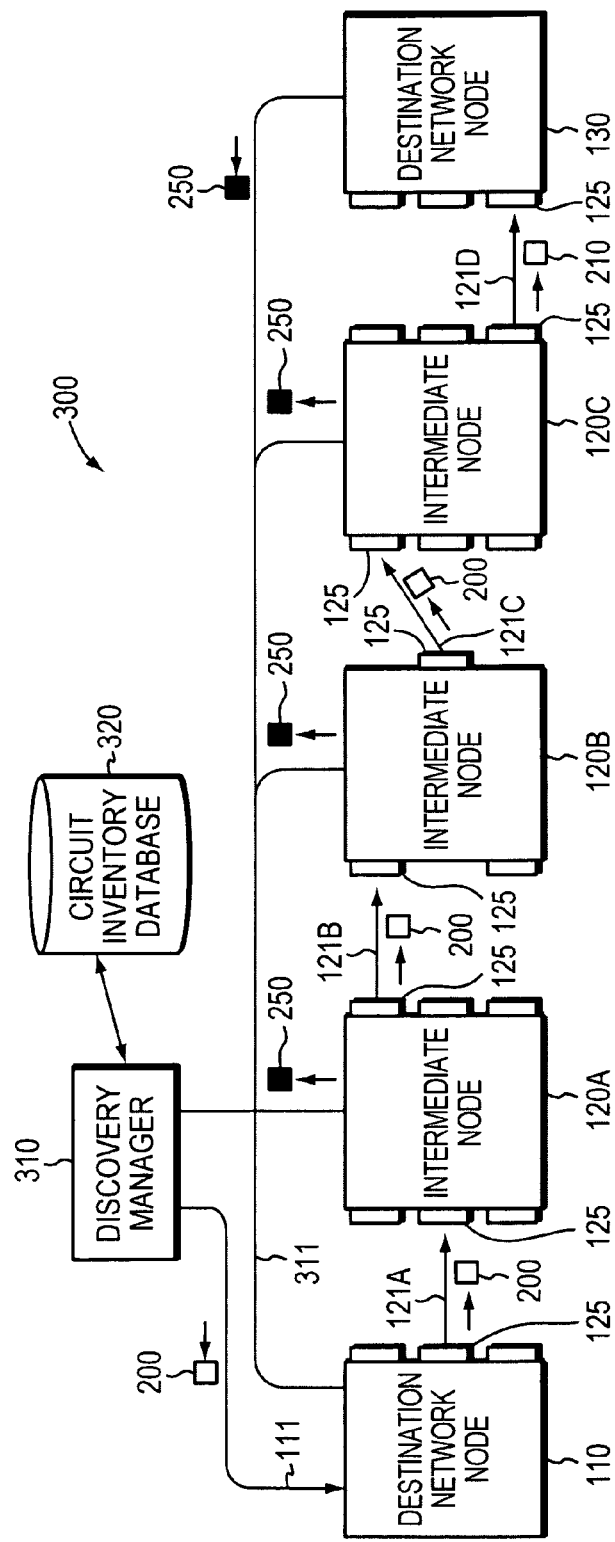
FIG. 3 is a block diagram of a network path having a discovery manager in communication with nodes in the network path of FIG. 1.

In particular, an embodiment of the present invention uses DS3 overhead X-bits. X-bits are non-critical alarm bits that are used to transmit Remote Alarm Indications (RAI), or more commonly known as Yellow Alarms. State changes (e.g., Yellow Alarms) can occur at network ports of the nodes in response to an alarm causing mechanism (e.g., a set overhead X-bit). A node in the network, such as a central discovery manager 310 as shown in FIG. 3, can be used to correlate nodes transmitting RAIs. The correlation can involve a comparison of the timing information of state changes at the ports to the signal with the set (i.e., triggering) overhead bit. An embodiment of the present invention includes sending a response signal 250 for correlation through a network, optionally through a control channel. In addition to finding a network path between two nodes, the overhead bit may be flooded through the network from one known node to discover network paths originating from that known node. Depending on the nature of the alarm setting at the network nodes, the mechanism used to cause the state changes (sometimes referred to as an "activation" signal) at the network nodes can be applied at different rates (e.g., greater than once per second), which in some cases goes undetected by certain nodes.

The following description refers to the embodiment described above in which a "signal" causes a yellow alarm in the intermediate nodes 120, which, in turn, report the occurrence of the yellow alarm to a central discovery manager 310 or add information to overhead or payload portions of the yellow alarm triggering signal or another signal that may be used for yellow or non-yellow alarm gathering purposes. These signals can then be correlated at either the end node, the starting node, or any other designated node to discover a network path.

Continuing to refer to FIG. 1, the nodes in the network path 121 typically have enough intelligence to provide information available to a management interface (not shown). In one embodiment of the invention deployed in a DS3 network, data 200 travels between the nodes 110, 120A, 120B, 120C, 130 in the network path 121 over a dedicated DS3 line, where the nodes of interest are responsive to a particular bit 220 in an overhead portion 210A of a DS3 packet frame 200.

Figure 2:
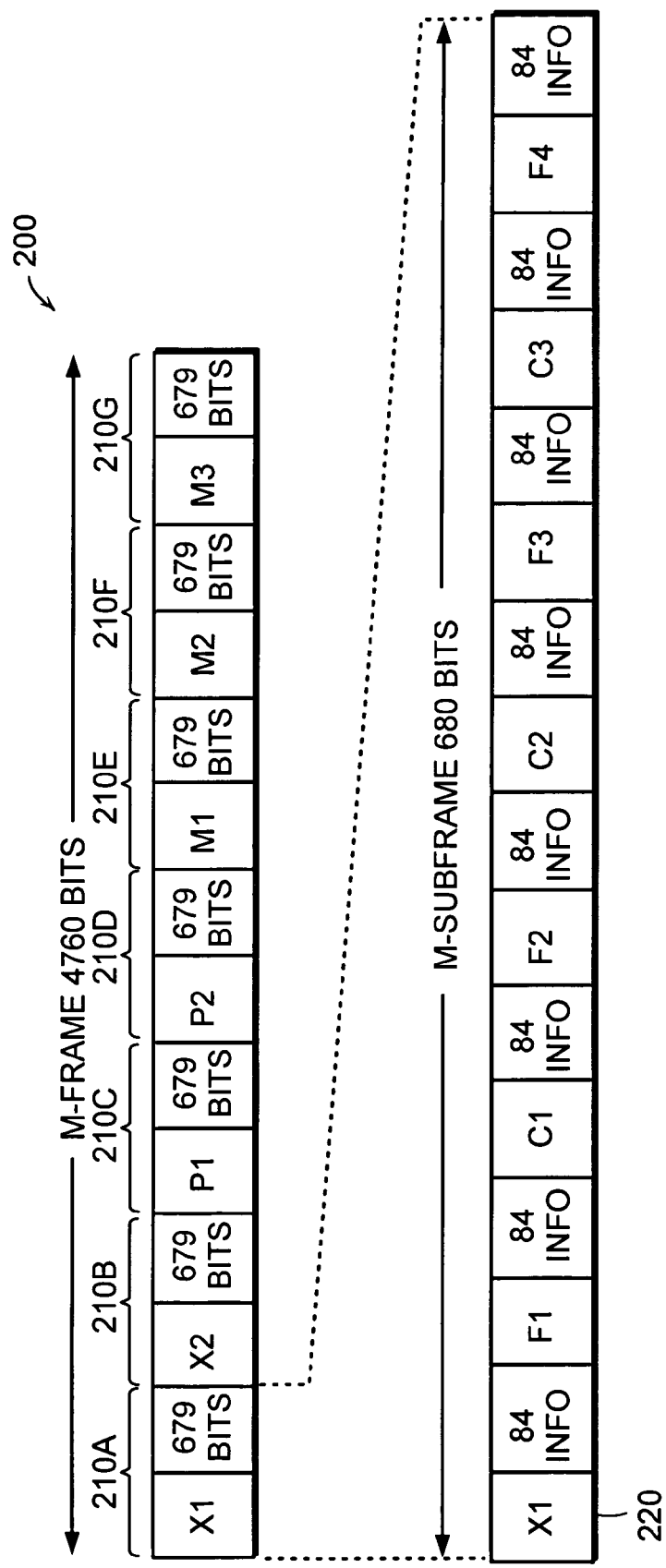
FIG. 2 is a diagram of a DS3 frame format of a data packet used in the network of FIG. 1.

FIG. 2 is a diagram of a typical DS3 data packet multiframe 200 that includes various bits, including the X-bits, employed to implement an embodiment of the present invention. The DS3 frame 200 comprises seven subframes 210A, 210B, 210C, 210D, 210E, 210F, 210G (collectively 210). Each of the subframes 210 contains 680 bits as shown in the lower portion of FIG. 2. The first bit 220 in each of the seven subframes 210 takes on a particular meaning within the frame. The first bit 220 in each subframe can contain either an X, P, or M bit, depending on its place in the overall DS3 multiframe 200. The X-bits are used in service messages and are located in the first bits of the first two subframes 210A, 210B; the P bits are used for Parity information for the preceding DS3 multiframe and are located in the first bits of the third and fourth subframes 210C, 210D; and the M bits are used for multi-frame alignment and are located in first bits of the last three subframes 210E-G.

In the present invention, the DS3 path layer overhead has not been customized to explicitly support the auto discovery application, or the path trace data. The present invention allows a user to obtain end to end connectivity information, using existing network nodes as well as intermediate or transit node information, in an expedient and automated manner through use of the standard packet overhead. Tracing operations use overhead bits and do not interfere with data transmission. Thus, the alarm can be sent on any type of signal, including a data signal, command signal, request signal, or appropriate Layer 1 signal. Various embodiments of the method and apparatus may be applied to a multitude of network systems, such as electrical signaling networks or optical networks, including DS3 or SONET networks. For example, another embodiment may allow use of higher Layer signals, such as a Layer 3 "ping" signal, to be employed to cause the alarming or non-alarming in the nodes 120 along the path 121 between the end nodes 110, 130.

An embodiment of the present invention uses the X-bit 220 for signaling purposes in detection of a network path. X-bits are available for low speed asynchronous signaling (ANSI T1.107) and are also defined to carry the Remote Alarm Indication (RAI) signals. When the first node 110 sends a signal 200 to the destination node 130, for example, a signal with an X-bit 220 set to activate alarms at nodes in the network path 121 allows for the correlation between the activation signal and the alarms to determine the location of a network path between nodes.

Although the present invention has been described using the X-bits of a DS3 frame, other overhead bits that are unused or used for purposes other than network path discovery, such as to trigger other benign alarms, can also be used in a DS3 network. Further, this technique can be deployed in other types of networks and network paths, including other electrical or optical networks, by using other bit locations typically used for purposes other than network path discovery.

FIG. 3 is a block diagram illustrating a system 300 which may be used to execute an embodiment of the present invention. One embodiment of the present invention may include a discovery manager 310 that interfaces with the circuit inventory database 320 to store information relating to the various network paths within a network.

In operation, the discovery manager 310 sends an initial activation signal 200 having a triggering alarm bit, such as an X-bit, through the first network node 110. The signal 200 travels through the network path 121, setting off alarms at each intermediate node 120 until it reaches the destination network node 130. The signal 200 may travel through various ports 125 on individual nodes 110, 120, 130 setting off alarms at each individual port of the various nodes. The expected travel path, time of reaching nodes, effect(s) upon a node, and other parameters associated with the activated signal 200 may be referred to as "expected travel parameters."

In this network, each of the nodes 120, 130 sends an alarm signal 250 back to the discovery manager 310 through a control channel 311 for the discovery manager 310 to correlate information with the initial activation signal. In other networks, the discovery manager 310 may poll the network nodes 110, 120, 130 for status information, which includes alarms. In yet other networks, the discovery manager 310 may receive alarm status information by a communication signal that includes overhead bits that are used to transport the alarm information or payload data used for same. That information may include device information, port information, and/or timing information.

By correlating or comparing the initial activation signal (according to expected travel parameters) with the alarms set throughout the network, the discovery manager 310 can trace the path through which the signal 200 traveled, thus discovering or identifying the network path. The discovery manager 310 can then automatically update the circuit inventory database 320 of a network carrier. Alternatively, a person can manually enter the network path information stored in the discovery manager 310 into the circuit inventory database 320.

Figure 4:
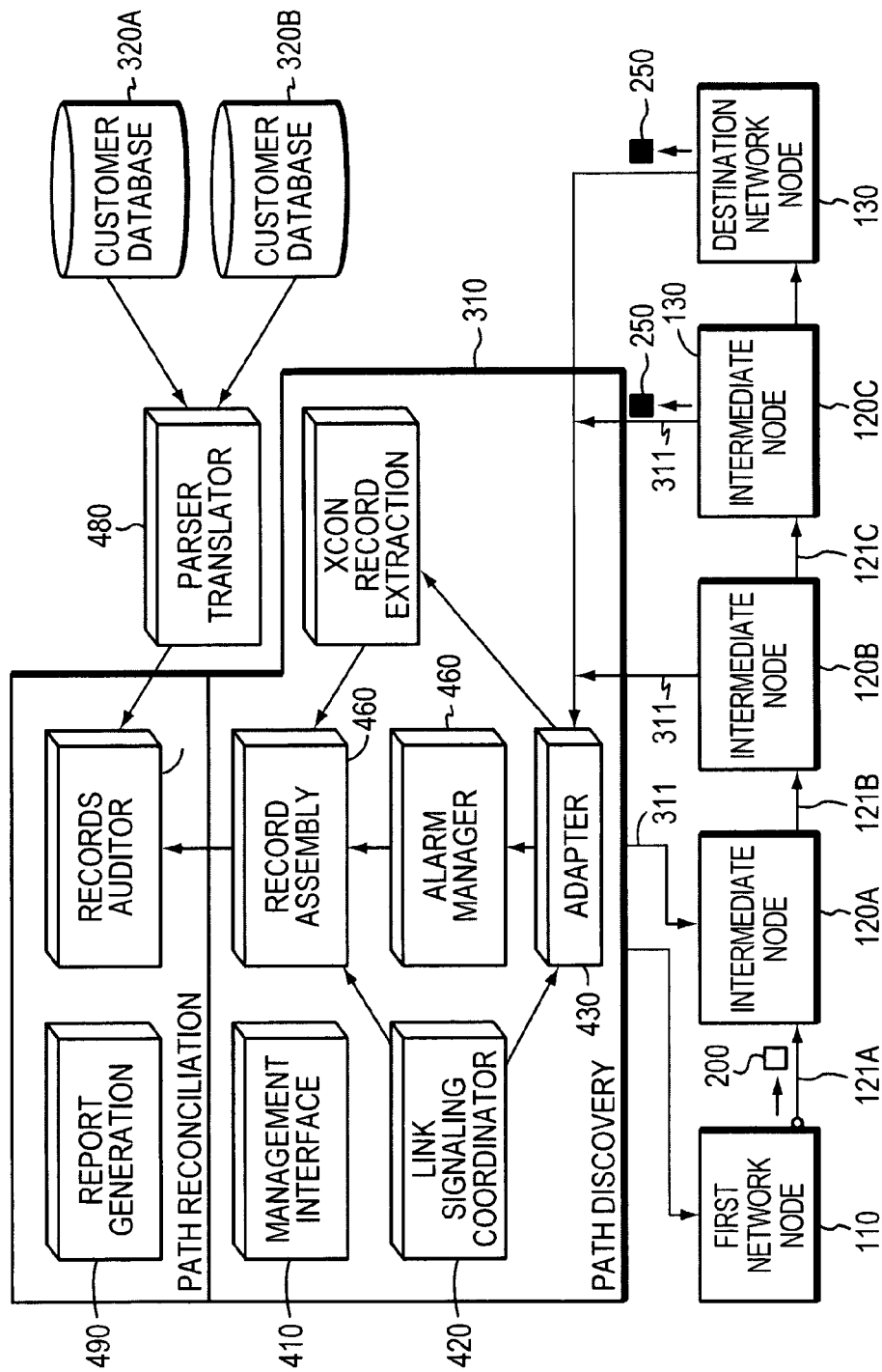
FIG. 4 is a block diagram of the discovery manager of FIG. 3.

FIG. 4 illustrates an exemplary internal configuration of the discovery manager 310. The discovery manager 310 may be organized into multiple modules that perform different tasks associated with the present invention. For example, a management interface 410 allows a user to initiate an activation signal 200 from the first network node 110 to the destination network node 130 via the network path 121. Once the user has initiated the path discovery, a link signaling coordinator 420 provides the detection signal information to an adapter 430. The adapter 430 serves as an interface with the network nodes 110, 120, 130 and sends the signal through the first end node 110 to the destination node 130 by way of the network path 121 through the intermediate nodes 120. As the activation signal 200 causes a state change (i.e., sets off an alarm) at each node in the network path, the adapter 430 of the discovery manager 310 receives alarm information from each of the nodes 110, 120, 130. The alarm information can be sent from the individual nodes through a number of different means, such as a control channel 311. This information, which includes cross connect data returned from the intermediate nodes 120, is fed from the adapter 430 into an alarm manager 440 and a cross-connect record extraction module 450. The information is used by cross-connect record extraction module 450 to resolve cross connects.

The alarm manager 440 and cross-connect record extraction module 450 provide alarm information and path information into a record assembly module 460, which also receives information from the link signaling coordinator 420 about the initial activation signal 200 sent through the network path 121. The record assembly module 460 (i) correlates the available information received from the alarms set at the nodes to identify the network path 121 from the first network node 110 to the destination network node 130, and (ii) sends the network path discovery result to a records auditor 470.

The records auditor 470 compares the discovery result records of the network path discovery to network node interconnection records currently stored in the customer circuit inventory databases 320A, 320B. Known techniques are employed. A parser translator 480 retrieves the network node interconnection records, which are sent to the records auditor 470. The records auditor 470 provides the comparison data to a report generation module 490. The output from the report generation module 490 may be an electronic or paper report to a user of the discovery manager 310 or may be an electronic set of records that update the records currently stored in the customer circuit inventory databases 320A, 320B. Techniques known in the art are used to achieve this.

Figure 5:
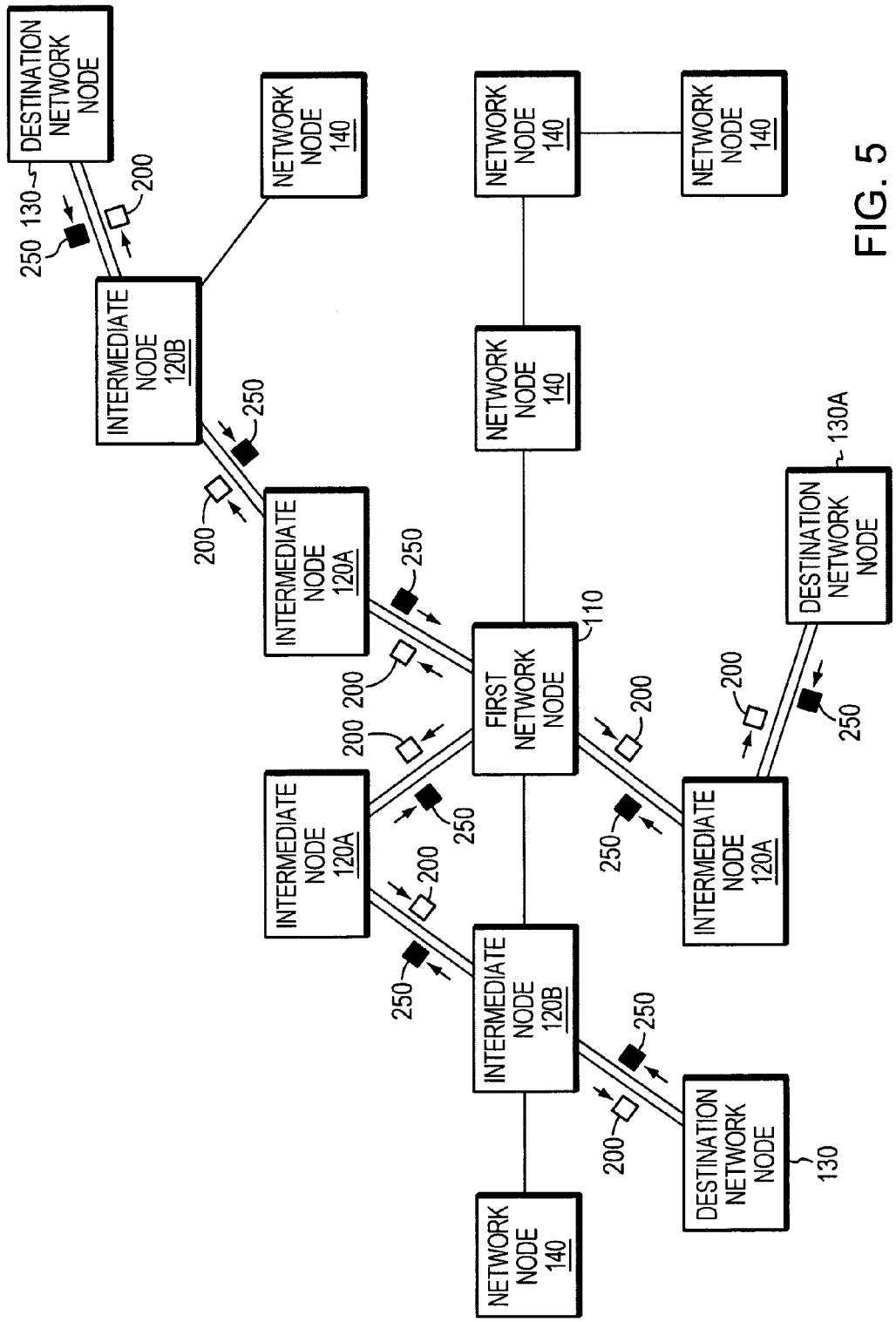
FIG. 5 is a block diagram of a network having a network path in which an alternative embodiment of the present invention may be deployed.

In another embodiment of the invention, the detection signal may be sent from a first end node through a particular port in the node to discover any network paths flowing from that port. For example, FIG. 5 illustrates a first end node 110 flooding activation signals 200 throughout a network along DS3 connections to discover network paths. The activation signals 200 travel through intermediate nodes 120 until they reach end nodes 130 of the various network paths. As discussed above, the intermediate nodes and end nodes of each network path send alarm signals 250 through the network for correlation in order to identify the various network paths within the network.

Figure 6:
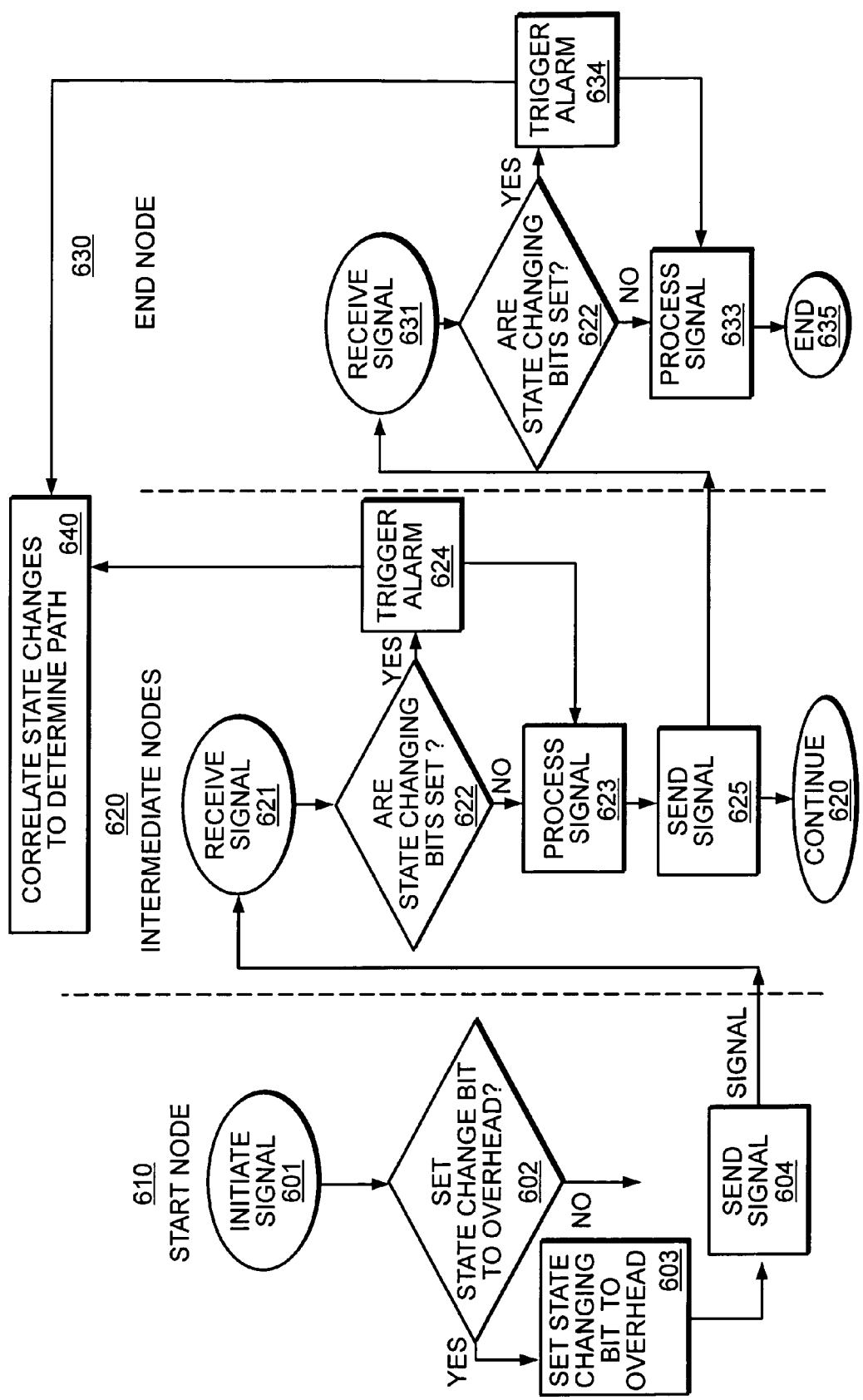
FIG. 6 is a flow chart demonstrating the operation of an embodiment of the present invention.

FIG. 6 is a flow chart illustrating the operation of the present invention from a starting node 610 through intermediate nodes 620 to an end node 630 of a network path. At a starting node 610, a signal is initiated 601. If the signal is for purposes of discovering a network path, the decision 602 is made as to whether the signal will be used for discovering a network path. If it is not, the signal is simply sent 604. If the signal is to be used for discovering a network path a state changing bit in the overhead is set 603 and then the signal is sent 604 from the start node through the network path to intermediate nodes 620.

At each intermediate node 620, the signal is received 621. The next step at the intermediate node is to determine whether the state changing bit is set 622. If it is not, the node simply processes 623 the signal. If the state changing node is set, an alarm is triggered 624. The alarm signal is sent to another node that correlates state changes to determine the path 640, and the initial/activation signal is processed 623. After processing, the signal is sent from the node 625 to either another intermediate node 620 in the network path or an end node 630. If the signal is sent to another intermediate node 620, the previously recited steps occur again.

If the signal is sent to an end node 630, the end node receives a signal 631 and determines whether the state changing bit is set 632. If it is not, the signal is simply processed 633. If the state changing bit is set, an alarm is triggered 634 and a signal is sent to another node for correlation with other alarm signals to determine the network path 640 and the signal is processed at 633. After processing the signal ends at 635.

In accordance with the foregoing, in an example embodiment of the present invention, a computer-readable medium having computer readable code stored thereon, when executed by a processor, causes the processor to automatically identify a network path in a network by activating state changes at nodes along a network path. The state changes are activated by a bit set in an overhead portion of a signal traveling along the network path, the bit being for purposes other than tracing a path. The state changes at the nodes are correlated in response to the signal to determine link connectivity between nodes in order to determine the network path.

While this invention has been particularly shown and described with references to preferred embodiments thereof, it will be understood by those skilled in the art that various changes in form and details may be made therein without departing from the scope of the invention encompassed by the appended claims. Bits predefined for other purposes in other portions of a network signal may similarly be used to activate a state change or elicit a traceable, discoverable response by network nodes of the present invention. Thus restated, a network path can be identified by using a bit predefined in an activation signal for purposes other than tracing a path, triggering corresponding predefined responses by nodes along a network path traveled by the signal, and correlating the responses by the nodes to the activation signal.

What is claimed is:

1. A method for automatically identifying a network path in a network comprising:
   activating state changes at nodes along a network path, the state changes activated by a bit set in an overhead portion of a signal traveling along the network path, the bit being for purposes other than tracing a path; and
   correlating the state changes at the nodes in response to the signal to determine link connectivity between nodes to determine the network path, the correlating including comparing timing information of the state changes and expected travel parameters of the signal.

2. The method of claim 1 wherein the bit is a non-critical alarm bit.

3. The method of claim 2 wherein the non-critical alarm bit is a DS3 overhead X-bit.

4. The method of claim 1 wherein the state changes occur at network ports of the nodes.

5. The method of claim 1 wherein correlating includes transmitting a response signal over the network path.

6. The method of claim 5 further including transmitting the response signal over a control channel.

7. The method of claim 1 wherein the network path is discovered between two known end nodes.

8. The method of claim 1 wherein the network path is discovered by flooding a network from one known node.

9. The method of claim 1 further comprising updating a database storing information about ports in the network nodes.

10. The method of claim 1 wherein causing the predetermined state changes along the network path occurs at a rate of less than or equal to once per second.

11. The method of claim 1 wherein causing state changes along the network path occurs at a rate of greater than once per second.

12. The method of claim 1 wherein the network is either an electrical signaling network or an optical network.

13. The method of claim 12 wherein the network path is a DS3 network.

14. The method of claim 12 wherein the optical network is a SONET network.

15. A computer network system comprising:
a plurality of nodes with connections defining a network path within a network, each node having a processor that is capable of indicating a state change by transmitting state change signals in response to the state change; and
a main node for sending an activation signal over the network, the activation signal having a bit location in an overhead portion being for purposes other than tracing a path, a known state of the bit in the signal causing a state change at nodes along the network path, and the main node including a processor that receives the state change signals, correlates the state changes at the nodes in response to the activation signal to determine link connectivity between nodes in the network path, and correlates the state changes at the nodes responsive to the activation signal by comparing timing information of the state changes and expected travel parameters of the activation signal.

16. The computer network system of claim 15 wherein the bit location is a non-critical alarm bit.

17. The computer network system of claim 16 wherein the non-critical alarm bit is a DS3 overhead X-bit.

18. The computer network system of claim 15 wherein the main node is a computer.

19. The computer network system of claim 15 wherein the state change occurs network ports at the nodes.

20. The computer network system of claim 15 further comprising a control channel along which the state change signal is sent.

21. The computer network system of claim 15 further comprising a database for receiving and storing information about ports in the network nodes.

22. The computer network system of claim 15 wherein activation signals are sent at a rate of less than or equal to once per second.

23. The computer network system of claim 15 wherein activation signals are sent at a rate of greater than once per second.

24. The computer network system of claim 15 wherein the network path is one of either an electrical path or an optical path.

25. The computer network system of claim 24 wherein the network path is a DS3 path.

26. The computer network system of claim 24 wherein the network path is a SONET path.

27. A computer network system comprising:
a network including connections between nodes in a network;
means for activating state changes along nodes of a network path in a network activated by a bit set in an overhead portion of a signal traveling along the network path, the bit being for purposes other than tracing a path; and
means for correlating the state changes at the nodes in response to the signal to determine link connectivity between the nodes in the network path, said means for correlating including means for comparing timing information of the state changes and expected travel parameters of the signal.

28. A non-transitory computer-readable medium having stored thereon sequences of instructions, the sequences of instructions including instructions, when executed by a processor, causes the processor to perform:
activating state changes along nodes of a network path activated by a bit set in an overhead portion of a signal traveling along the network path, the bit being for purposes other than tracing a path; and
correlating the state changes at network nodes to the signal to determine link connectivity between nodes in the network path, the correlating including comparing timing information of the state changes and expected travel parameters of the signal.

29. A method of updating customer databases containing information about nodes in a network path in a network, the method comprising:
offering a service for updating a customer data base containing information about nodes in a network; and
performing the service by:
(i) transmitting a signal activating state changes along a subset of the customer's nodes in the network, the signal including a bit set in an overhead portion being for a purpose other than tracing a path;
(ii) correlating the state changes at the nodes with the path of the signal to determine connectivity between the customer's nodes, the correlating including comparing timing information of the state changes and expected travel parameters of the signal; and
(iii) updating the customer's databases with the determined connectivity.

* * * * *